United States Patent [19]

Bassi

[11] 4,392,683
[45] Jul. 12, 1983

[54] RETRACTABLE ASHTRAY, PARTICULARLY FOR MOTOR VEHICLES

[75] Inventor: Alberto Bassi, Turin, Italy

[73] Assignee: ITW Fastex Italia S.p.A., Turin, Italy

[21] Appl. No.: 295,275

[22] Filed: Aug. 24, 1981

[30] Foreign Application Priority Data

Sep. 8, 1980 [IT] Italy ............................... 24538 A/80

[51] Int. Cl.³ ............................................ B60M 3/12
[52] U.S. Cl. ................................... 296/37.9; 224/278
[58] Field of Search ...................... 296/37.9; 224/278

[56] References Cited

U.S. PATENT DOCUMENTS

| | | | |
|---|---|---|---|
| 2,311,968 | 2/1943 | Schallis | 296/37.9 |
| 2,398,936 | 4/1946 | Hendricks | 296/37.9 |
| 2,770,388 | 11/1956 | Legge | 296/37.9 |
| 2,812,097 | 11/1957 | Legge | 296/37.9 |

*Primary Examiner*—Richard A. Bertsch

*Attorney, Agent, or Firm*—Trexler, Bushnell & Wolters, Ltd.

[57] ABSTRACT

A retractable ashtray, particularly for motor vehicles, comprises a release mechanism made integral in a plastic material.

This mechanism comprises essentially a base plate and a body hinged to said plate and having two opposite walls one of which bears a hook and the other a pin, on which an idle pawl is mounted. The latter cooperates, during movements of the ashtray from the in-use position to the out-of-use position and vice versa, with the ribs born by the base plate, movements of the hinged body with respect to the base plate being opposed by a spring which tends to space apart from each other the two elements, the maximum spacing between them being determined by the engagement of a hook born by the base plate with a hook born by a wall of the body hinged to said base plate.

5 Claims, 10 Drawing Figures

RETRACTABLE ASHTRAY, PARTICULARLY FOR MOTOR VEHICLES

The present invention relates to retractable ashtrays, particularly for motor vehicles.

These types of ashtrays are applied on an inner panel of the motor vehicle, for example on a door panel, and can be brought from an out-of-use position, in which they are flush with the outer wall of the panel, in an in-use position in which they project from said wall, and vice versa.

In the design of such ashtrays the particular conditions of use thereof must be considered. In fact a motor vehicle undergoes continuous vibrations which affect also the auxiliary equipment and therefore also the ashtrays.

The prior art ashtrays of this type have the disadvantage that because of the vibrations they undergo a continuous rubbing occurs between the metal parts and the non metal generally plastic parts of the ashtrays with a wear especially of the non metal parts and therefore the danger that the ashtray may become useless in a comparatively short time.

It should be also considered that a retractable ashtray requires a rather complicated release mechanism and that for economical, functional and noise reasons it is required to reduce the number of components of said mechanism and the time required for its assembly as much as possible.

Starting from these considerations, the present invention aims to provide a retractable ashtray, particularly for motor vehicles which is simple and unexpensive and eliminates the disadvantages of the prior art ashtrays of this type.

More particularly the ashtray according to the invention is characterized in that its release mechanism is integrally made of plastic material and comprises a first and a second wall hinged to each other along a common edge by a thinning of their thickness at said edge, and a third wall integral with said second wall and opposite thereto, said third wall bearing a pin on which an idle pawl is mounted, said first wall having arcuate guide ribs thereon which are concentric to the hinge axis and are intended to guide the pawl during relative movements of the two walls hinged to each other when the ashtray is moved from its retracted position and vice versa, and to provide a stop abutment for the pawl at said two ashtray positions, as well as a hook, and said second wall also bearing a hook intended to engage said hook of said first wall, a spring being interposed between said first and said third wall which keeps said two hooks in engagement.

An ashtray of this type has the advantage that its release mechanism is made fully of plastic material, except the spring, so that any wear due to the rubbing of the metal parts against the plastic parts is avoided.

Secondly, the whole release mechanism can be obtained in a single molding step, except the pawl which, since it has to be mounted idle on the pin born by one of the walls, is a separate piece.

In addition, the assembly of the release mechanism is extremely simple and fast since it is reduced to the insertion of the pawl and spring and the hooking to each other of the parts hinged to one another.

The invention will be better understood from the following detailed description, given merely by way of example and therefore in no limiting sense, of an embodiment thereof, referring to the accompanying drawings in which.

Figure 1:
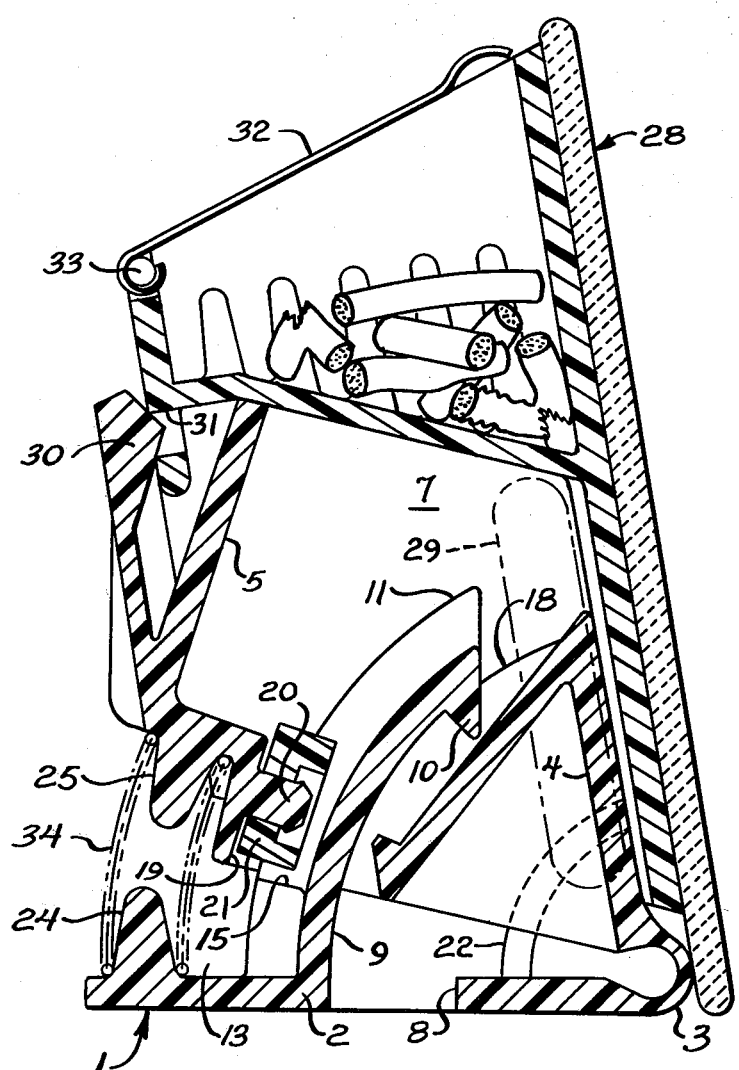
FIG. 1 is an elevational cross-sectional view of an ashtray according to the present invention.
Figure 2:
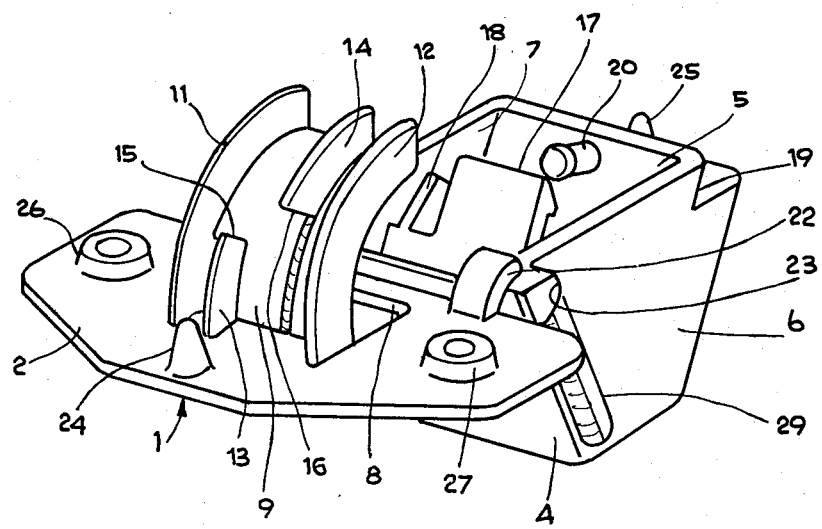
FIG. 2 is a perspective view of the release mechanism integrally made of plastic material as it appears after the molding step and before its assembly to form the ashtray, to a reduced scale with respect to FIG. 1.
Figure 3:
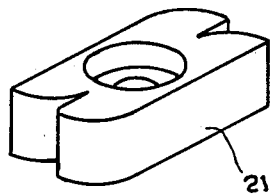
FIG. 3 is a perspective view of the pawl of the release mechanism.

Referring to FIGS. 1 to 3, it is seen the release mechanism of the ashtray referred to generally as 1 comprises essentially a base plate 2 connected integrally, by means of a hinge 3, to a wall 4 of a body in the form of a hopper which is formed besides by the wall 4, by a wall 5 substantially opposite to the wall 4, and by two side walls 6 and 7 joining the walls 4 and 5.

Provided in the base plate 2 is a slot 8 and from a longitudinal side of the slot a curved wall 9 projects from the base plate 2, concentric to the centerline of the hinge 3, which ends at its free end with a hook 10. This wall is deformed laterally by two ribs 11,12 and from it there projects between said ribs a rib 13 extending from the base plate 2 along a length of the curved wall 9, and a rib 14, spaced from the rib 13 both axially and circumferentially, which extends from the top of the curved wall 9 to a height above the height of the top surface 15 of the rib 13, said rib 14 being defined at the bottom by a surface 16.

Projecting from the wall 4 are a hook 17 and two ribs 18, of which only one is shown in the drawing. The wall 5 ends at an edge thereof with a step 19 from whose rise a pin 20 projects having an enlarged head. Mounted idle on said pin is a pawl 21 shown in perspective view in FIG. 3.

Projecting from the base plate 2 are also two guide hooks 22, of which only one is shown on the drawings. A lug 23 is provided on each of the walls 6 and 7. Projecting from the same base plate 2 is also a frustoconical boss rounded at its top and a similar boss 25 projects from the tread of the step 19 of the wall 5. Provided on the base plate 2 are also two bosses 26,27 for securing the base plate 2 by means of screws to the panel in which the ashtray is assembled.

To assemble the ashtray an end of a helical spring 34 is centered on the boss 24 and the pawl 21 is snapped on the pin 20. At this point the hopper shaped body formed by the walls 4, 5, 6 and 7 is rotated about the hinge 3 until it is brought in the position which the hook 17 has climbed, because of its resiliency, over the hook 10. The movements of the pawl 21 during rotation of the hopper shaped body until it engages with a snap action the rib 14 will clearly appear from the description hereinafter of the operation of the ashtray. It is seen that once the release mechanism is mounted, the spring 34 reacts between the base plate 2 and the tread wall of the step 19, centered on the latter by the boss 25.

Figure 1A:
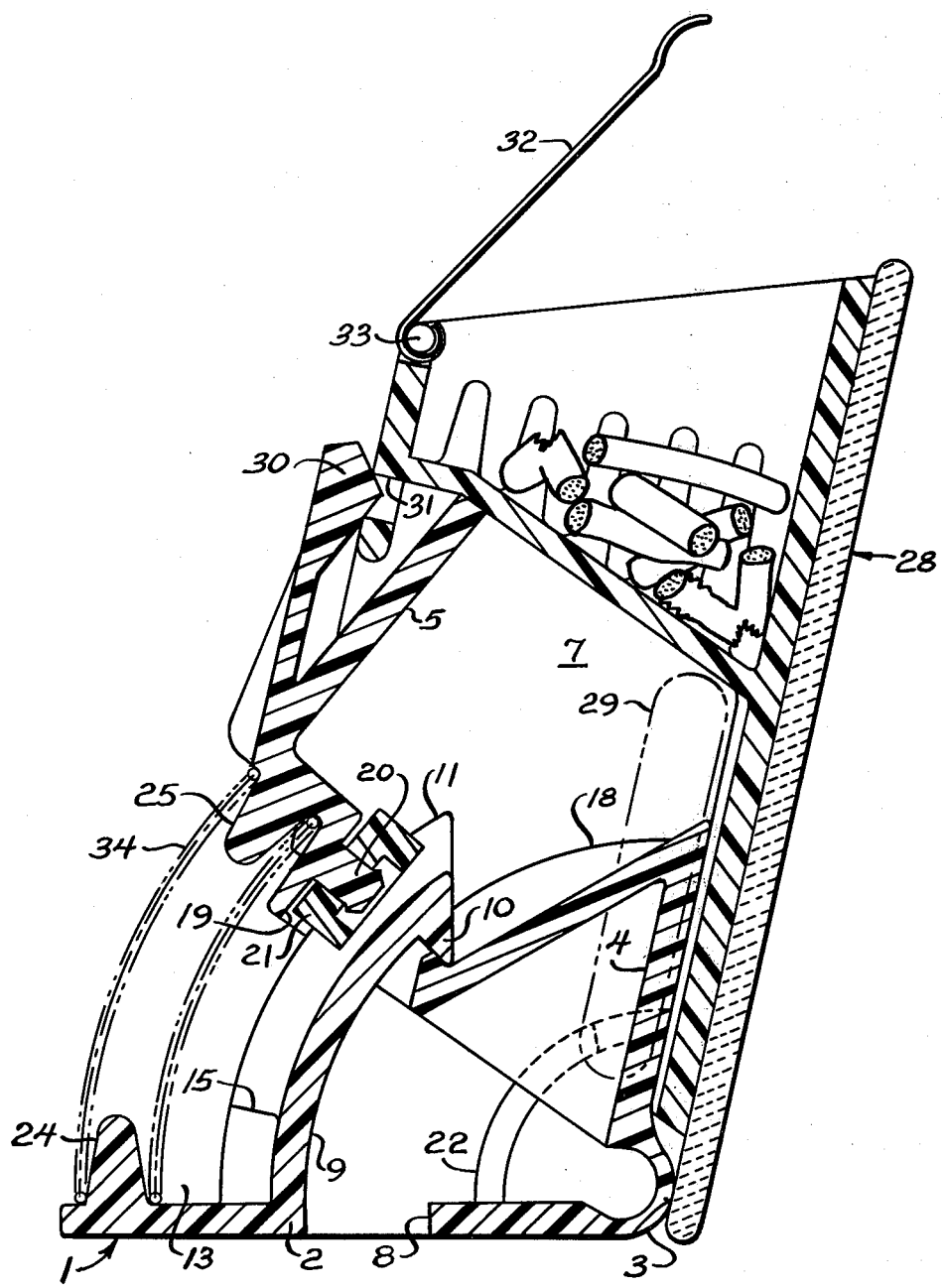
FIG. 1A is an elevational cross sectional view of an ashtray according to the present invention in the in-use or drawn out position.

In FIG. 1 the ashtray is shown in full lines in the out-of-use or retracted position and it is shown in the in-use or drawn out position in FIG. 1A.

There will be explained now the operation of the ashtray with reference to FIGS. 4 to 9 which show diagrammatically the various positions taken by the pawl 21 with respect to the ribs 13 and 14 as the ashtray passes from the in-use position to the out-of-use position and vice versa.

Figure 4:
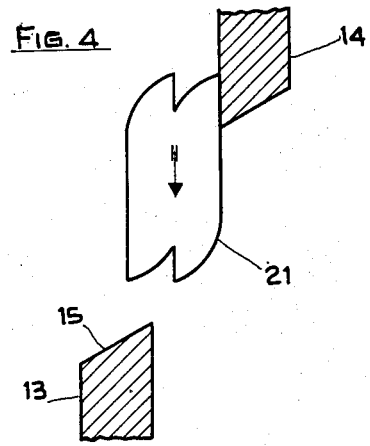
FIGS. 4 to 9 are diagrammatic illustrations of the various positions the pawl takes during movement of the ashtray from the in-use position to the out-of-use position and vice versa.

In FIG. 4 the pawl 21 is shown in an in-use position of the ahtray. It is seen that in this position the pawl bears by a flat surface thereof against a lateral surface of the rib 14 and therefore it could not prevent a further rotation of the hopper shaped body with respect to the base plate 24 under the action of the spring 34. Said undue rotation beyond a predetermined point is prevented by the two hooks 10 and 17 which engage each other and hold the parts in a mutual fixed position.

Figure 5:
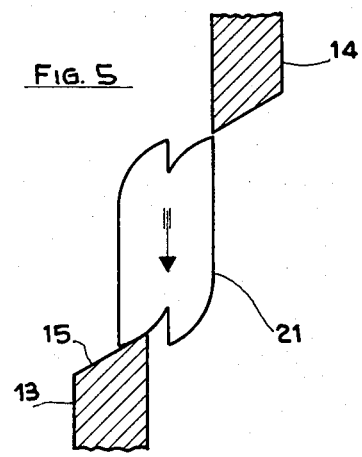
Figure 8:
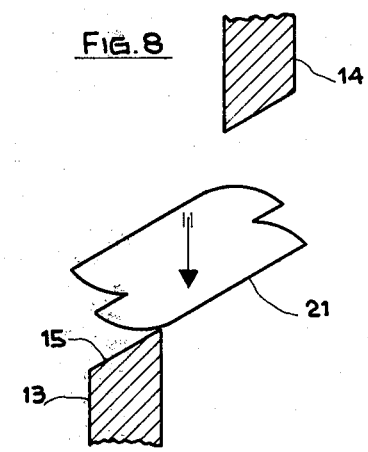
Figure 6:
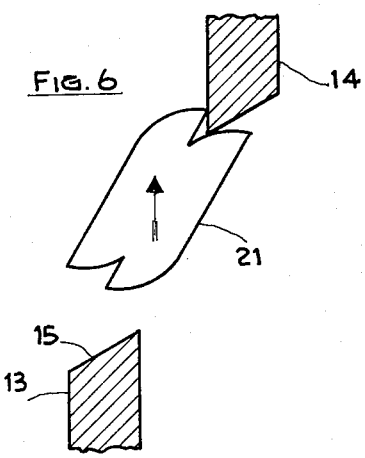
Figure 9:
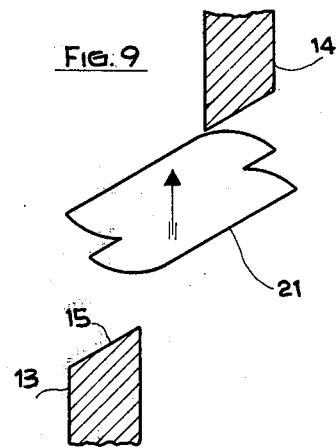

If it is desired to bring the ashtray in the out-of-use position, a pressure is exerted on the upper portion of the box 28 thus applying a force on the pawl in the direction of the arrow in FIG. 4. The pawl moves downwardly along a side surface of the rib 14 until it leaves said surface and contacts by its lower portion the top surface 15 of the rib 13 as shown in FIG. 5. At this time, under the continuous action of the force in the direction of the arrow, the pawl starts rotating about its support point on the surface 15 acting as its fulcrum until it arrives in the position of FIG. 6 in which it engages by means of its upper profile the lower edge of the rib 14. At this point the pressure on the box 28 can be relieved, since the spring 34, whose force is exerted in the direction of the arrow, cannot bring back the hopper shaped body any longer because of the locking engagement of the pawl 21 in the edge of the rib 14. The ashtray is in the well determined out-of-use position.

Figure 7:
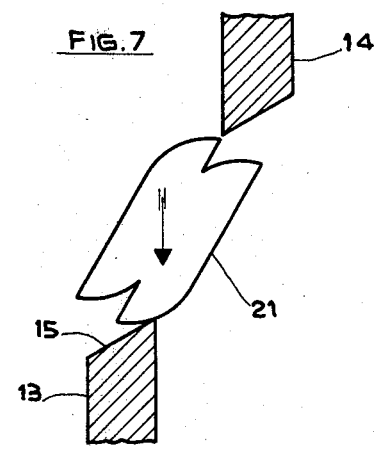

If it is desired to bring back the ashtray in the in-use position a pressure is exerted on the upper portion of the box 28 exactly as in the case of the preceding operation until the pawl 21 is brought in the position of FIG. 7 in which it is released from the engagement with the rib 14 and engages by means of its lower profile the top surface 15 of the rib 13. At this time, under the action of force still exerted in the direction of the arrow, the pawl starts rotating about its point of support on the surface 15 acting as its fulcrum until it arrives in the position of FIG. 8 in which it is beneath the rib 14. If now the box is released so as to annul the presure exerted on it, the pawl 21 is brought under the action of the spring 34 first in the position of FIG. 9, i.e. in contact with the lower surface of the rib 14, and then, by rotating about the edge of the rib 14 acting as a fulcrum, in the position of FIG. 4 with a side surface thereof in contact with a side surface of the rib 14. At this time the hook 10 integral with the base plae 2 engages the hook 17 integral with the wall 14 whereby the pawl cannot move any longer under the action of the spring 34.

It is seen that the described ashtray has no metal parts which in the operation can rub against the plastic parts whereby the disadvantage due to the wear of the plastic parts is eliminated.

In addition, since during movements of the hopper shaped body with respect to the base plate 2 the guide hooks are backed constantly by the lugs 23, the release mechanism cannot undergo warping because of transverse stresses on the wall 4. Once the release mechanism is assembled, even though the hinge 3 should break, the mechanism would still remain operating because of the engagement of the hooks 22 with the lugs 23 and the hook 10 with the hook 17.

To secure the described ashtray to the panel, f.e. the door of the motor vehicle, the base plate is secured to the panel by means of screws inserted in the two bosses of the base plate. Then the box is secured to the release mechanism in any suitable manner which will not be described in detail because it is no part of the present invention. It is sufficient to mention that the box 28 is caused to slide by means of suitable grooves thereof, not shown, on the guide ribs 29 provided to this purpose on the walls 6 and 7 of the release mechanism until the hook 30 projecting outwardly from the wall 5 snaps into the slot 31 provided in a wall of the box 28. The latter is closed in the usual manner by a cap 32 which can be opened and is pivoted on the pin 33 and biased constantly by a spring, not shown, in a closed position.

While but one embodiment of the invention has been illustrated and described, it is obvious that a number of modifications and changes can be made without departing from the scope of the invention. In particular, the ashtray according to the invention could be devised for other uses, f.e. on railway passenger coaches, aircraft, etc.

I claim:

1. A retractable ashtray, particularly for motor vehicles, characterized in that its release mechanism is integrally made of plastic material and comprises a first and a second wall hinged to each other along a common edge by a thinning of their thickness at said edge, and a third wall integral with said second wall and opposite thereto, said third wall bearing a pin on which an idle pawl is mounted, said first wall having arcuate guide ribs thereon which are concentric to the hinge axis, and are intended to guide the pawl during relative movements of the two walls hinged to each other when the ashtray is moved from its retracted out-of-use position to its extracted in-use position and vice versa, and to provide a stop abutment for the pawl at said two ashtray positions as well as a hook, and said second wall also bearing a hook intended to engage said hook of said first wall, a spring being interposed between said first and said third wall which urges said two hooks toward engagement.

2. Ashtray as claimed in claim 1, characterized in that said two ribs extend along different sections of a circumference, the upper end of one of said ribs being spaced from the lower end of the other rib by a gap substantially corresponding to the greatest pawl dimension.

3. Ashtray as claimed in claims 1 or 2, characterized in that said pawl has at least a flat surface adapted to cooperate with the lateral flat surface of one of said guide ribs, and at least a contour which has a notch for engaging an end of said rib.

4. Ashtray as claimed in claim 2, characterized in that said ribs are axially spaced from each other.

5. Ashtray according to claim 2, characterized in that said first wall has arcuate hooks and said second wall has guide lugs for said arcuate hooks.

* * * * *